United States Patent Office 3,235,449
Patented Feb. 15, 1966

3,235,449
DISINFECTANT AND FUNGICIDAL
COMPOSITIONS
Klaus Thomas, Biberach, Richard Sehring, Ingelheim, and
Dietrich Jerchel, Biberach, Germany, assignors to C. H.
Boehringer Sohn, Ingelheim am Rhine, Germany, a
limited partnership of Germany
No Drawing. Filed Aug. 23, 1962, Ser. No. 218,848
Claims priority, application Germany, Aug. 25, 1961,
T 20,657
4 Claims. (Cl. 167—33)

This invention relates to disinfectant and fungicidal compositions as well as to a method of combating bacteria and fungi.

More specifically, the present invention relates to disinfectant and fungicidal compositions comprising, as a bactericidal and fungicidal active ingredient, a quaternary 4-pyridyl thioether of the formula

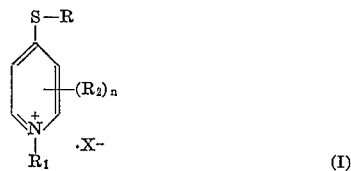

(I)

wherein
R is selected from the group consisting of saturated or unsaturated, straight- or branched-chain, acyclic hydrocarbyl of 1 to 16 carbon atoms which may have one or more hydroxyl, carboxyl, carbalkoxy or carbamyl groups attached thereto, phenyl which has one or several halogen, hydroxyl, alkoxy, carboxyl or nitro substituents attached thereto, naphthyl which may have one or several halogen, hydroxyl, alkoxy, carboxyl or nitro substituents attached thereto, and aralkyl which may have one or several halogen, hydroxyl, alkoxy, carboxyl or nitro substituents attached to the aryl moiety thereof,
$R_1$ is selected from the group consisting of saturated or unsaturated, straight- or branched-chain, acylic hydrocarbyl of 1 to 16 carbon atoms which may have one or more hydroxyl, carboxyl, carbalkoxy or carbamyl substituents attached thereto, phenyl which has two or three nitro groups attached thereto, and aralkyl which may one or several halogen, alkyl, hydroxyl, alkoxy, carboxyl or nitro substituents attached to the aryl moiety thereof,
$R_2$ is selected from the group consisting of hydrogen and alkyl,
$n$ is a whole number from 0 to 2, inclusive, and
$x$ is the anion of an inorganic or organic acid, preferably the anion of a hydrohalic acid or sulfonic acid,
and where one of substituents R and $R_1$ contains at least six carbon atoms.

The quaternary 4-pyridyl theioethers of the formula I, which are used as the active ingredients in bactericidal and fungicidal compositions according to the present invention, may be prepared by a variety of known methods. Among these, however, the following have been found to be the most convenient and efficient:

METHOD A

Reaction of a 4-pyridyl-thioether of the formula

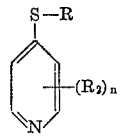

(II)

wherein R, $R_2$ and $n$ have the meanings previously defined, with a compound of the formula $R_1X$ (III)

wherein $R_1$ and X have the meanings previously defined.

The reaction is performed at elevated temperatures, preferably at a temperature between 70 and 130° C., and in the presence of an inert organic solvent, such as ethanol, acetonitrile or ethyl acetate. It is advantageous to provide a stoichiometric excess of Compound III for the reaction and, if Compound II is soluble in Compound III, it may simultaneously serve as the solvent medium. In the event that the boiling point of the solvent is lower than the required reaction temperature, the reaction is performed under superatmospheric pressure.

The 4-pyridyl-thioethers (II) used as starting materials in the present method may themselves be prepared, for instance, by reacting 4-pyridyl-pyridinium salts with $H_2S$ and the corresponding alkylhalides, aralkylhalides or halonitrobenzenes. Another method of preparing Compounds II, especially those wherein R is a substituted phenyl radical, is by reacting 4-pyridyl-pyridinium salts with corresponding thiophenols [see Berichte, 89, 2921 (1956)].

Compounds $R_1X$ (III) are customary quaternizing agents, such as unsubstituted or substituted alkylhalides, aralkylhalides, alkyl- and aralkyl-esters of organic sulfonic acids or di- and tri-nitro-halobenzene.

METHOD B

Reaction of a quaternary 4-halo-pyridinium compound of the formula

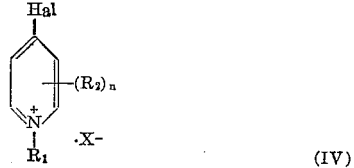

(IV)

wherein $R_1$, $R_2$, X and $n$ have the meanings defined above and Hal is chlorine or bromine, with a mercaptan of the formula

R—SH (V)

wherein R has the meanings previously defined. The reaction is carried out at elevated temperatures, preferably at a temperature between 70 and 130° C. It is advantageous to perform the reaction in the presence of an inert organic solvent, such as dimethylformamide.

This method is especially suitable for the preparation of those compounds of the Formula I wherein $R_1$ is lower alkyl. The quaternary 4-halo-pyridinium Compounds IV, which are used as starting materials in the present method, may themselves be prepared, for instance, by halogenation of pyridine as described in Berichte, 89, 2923 (1956), and subsequent quaternization of the reaction product with a compound of the Formula III in accordance with known methods.

METHOD C

Reaction of a quaternary 4-halo-pyridine of the Formula IV above with KSH to form the corresponding 4-mercapto-pyridinium compound, and subsequent etherification of the 4-mercapto-pyridine compound with an alkyl-halide, an aralkyhalide or a nitrohalobenzene.

The reaction between the 4-halo-pyridinium Compound IV and potassium hydrosulfide is performed at elevated temperatures, preferably between 70 and 150°C., and if desired in the presence of an inert organic solvent, such as dimethylformamide.

If desired, the anion X in the end products obtained by methods A, B and C may be exchanged for any other desired anion of an organic or inorganic acid by customary methods, such as by double decomposition.

The following examples shall illustrate the preparation of a few representative compounds of the group embraced by Formula I.

*Example 1.—Preparation of N-allyl-[pyridinium-(4)-n-dodecyl-thioether]-bromide by Method A*

A solution of 14 gm. of 4-pyridyl-n-dodecyl-thioether and 6 gm. of allyl bromide in 50 cc. of acetonitrile was refluxed for four hours. Thereafter, while still hot, the reaction solution was filtered through charcoal. The filtrate was allowed to cool and was then admixed with ethyl acetate, whereby a precipitate separated out. The precipitate was separated by a vacuum filtration and was again recrystallized from ethyl acetate. The product was identified to be the compound of the formula

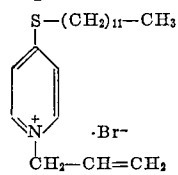

having a melting point of 59°C. The yield was 15 gm. (75% of theory).

*Example II*

Using a procedure analogous to that described in Example I, heating a mixture of 4-pyridyl-n-dodecyl-thioether and methyl-p-toluene-sulfonate for nine hours at 100°C. yielded N-methyl-[pyridinium-(4)-n-dodecyl-thioether]-p-toluene-sulfonate of the formula

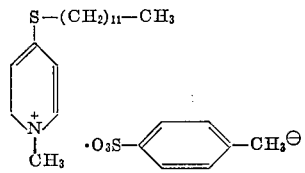

having a melting point of 138–139°C. The yield was 90% of theory.

*Example III*

Using a procedure analogous to that described in Example I, refluxing a solution of 4-pyridyl-n-dodecyl-thioether and dimethylsulfate in acetonitrile for three hours yielded N-methyl-[pyridinium-(4)-n-dodecyl-thioether]-methylsulfate of the formula

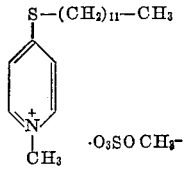

having a melting point of 83°C. The yield was 88% of theory.

*Example IV*

Using a procedure analogous to that described in Example I, refluxing a solution of 4-pyridyl-n-hexadecyl-thioether and methyl-p-toluene-sulfonate in ethyl acetate for four hours yielded N-methyl-[pyridinium-(4)-n-hexadecyl-thioether]-p-toluene-sulfonate of the formula

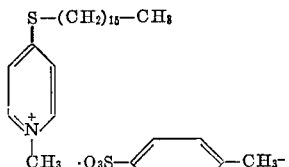

having a melting point of 125–126°C. The yield was 61% of theory.

*Example V*

Using a procedure analogous to that described in Example I, refluxing a solution of 3-methyl-4-pyridyl-n-hexadecyl-thioether and methyl-p-toluene-sulfonate in ethyl acetate for two hours yielded N-methyl-3-methyl-[pyridinium - (4) - n - hexadecyl - thioether] - p - toluene-sulfonate of the formula

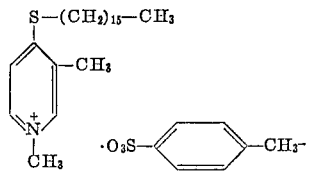

having a melting point of 52° C. The yield was 36% of theory.

*Example VI*

Using a procedure analogous to that described in Example I, heating a mixture of 4-pyridyl-(2'-hydroxyphenyl)-thioether and methyl-p-toluene-sulfonate for two hours at 120° C. yielded N-methyl-[pyridinium-(4)-(2'-hydroxy-phenyl)-thioether] - p - toluene-sulfonate of the formula

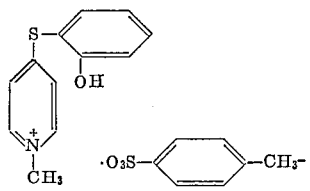

having a melting point of 213° C. The yield was 94% of theory.

*Example VII*

Using a procedure analogous to that described in Example I, heating a mixture of 4-pyridyl-(p-chlorophenyl)-thioether and methyl-p-toluene-sulfonate for one hour at 100° C. yielded N-methyl-[pyridinium-(4)-(p-chlorophenyl)-thioether]-p-toluene-sulfonate of the formula

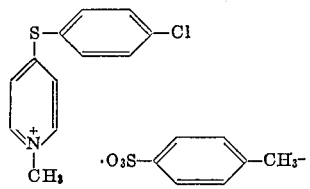

having a melting point of 153–155° C. The yield was 89% of theory.

*Example VIII*

Using a procedure analogous to that described in Example I, heating a mixture of 4-pyridyl-(o-carboxylphenyl)-thioether and methyl-p-toluene-sulfonate for one hour at 100° C. yielded N-methyl-[pyridinium-(4)-(o-carboxylphenyl.-thioether]-p-toluene-sulfonate of the formula

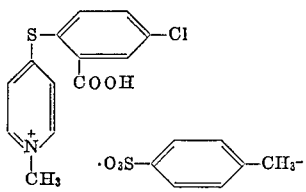

having a melting point of 173–175° C. The yield was 70% of theory.

*Example IX*

Using a procedure analogous to that described in Example I, heating a mixture of 4-pyridyl-(o-nitrophenyl)-thioether and methyl-p-toluene-sulfonate for one hour at 100° C. yielded N-methyl-[pyridinium-(4)-(o- nitrophenyl)-thioether]-p-toluene-sulfonate of the formula having a melting point of 114° C. The yield was 89% of theory.

*Example X*

Using a procedure analogous to that described in Example I, heating a mixture of 4-pyridyl-(p-nitrophenyl)-thioether and methyl-p-toluene-sulfonate for two hours at 100° C. yielded N-methyl-[pyridinium-(4)-(p-nitrophenyl)-thioether]-p-toluene-sulfonate of the formula having a melting point of 170° C. The yield was 75% of theory.

*Example XI*

Using a procedure analogous to that described in Example I, heating a mixture of 4-pyridyl-(p-chlorobenzyl)-thioether and methyl-p-toluene-sulfonate for four hours at 100° C. yielded N-methyl-[pyridinium-(4)-(p-chlorobenzyl)-thioether]-p-toluene-sulfonate of the formula having a melting point of 188° C. The yield was 64% of theory.

*Example XII*

Using a procedure analogous to that described in Example I, heating a mixture of 4-pyridyl-(p-chlorophenyl)-thioether and 1-bromo-ethanol-2 for three hours at 120° C. yielded N-(β-hydroxyethyl)-[pyridinium-(4)-(p-chlorophenyl)-thioether]-bromide of the formula having a melting point of 150–151° C. The yield was 92% of theory.

*Example XIII*

Using a procedure analogous to that described in Example I, heating a solution of 4-pyridyl-n-hexadecyl-thioether and chloroacetic acid in ethanol for one hour at 70° C. yielded N-carboxymethyl-[pyridinium-(4)-n-hexadecylthioether]-chloride of the formula having a melting point of 93° C. The yield was 54% of theory.

*Example XIV*

Using a procedure analogous to that described in Example I, heating a mixture of 4-pyridyl-n-dodecylthioether and chloroacetic acid ethyl ester for two hours at 80° C. yielded N-carbethoxy-methyl-[pyridinium-(4)-n-dodecyl-thioether]-chloride of the formula having a melting point of 170° C. The yield was 75% of theory.

*Example XV*

Using a procedure analogous to that described in Example I, heating a solution of 4-pyridyl-n-dodecyl-thioether and chloroacetic acid isopropyl ester in acetonitrile for eight hours at 70° C. yielded N-carboisopropoxymethyl-[pyridinium-(4)-n-dodecyl-thioether]-chloride of the formula having a melting point of 112° C. The yield was 46% of theory.

*Example XVI*

Using a procedure analogous to that described in Example I, heating a solution of 4-pyridyl-n-dodecyl-thioether and chloroacetic acid-n-butyl ester in acetonitrile for six hours at 70° C. yielded N-carbo-n-butoxy-methyl-[pyridinium-(4)-n-dodecyl-thioether]-chloride of the formula having a melting point of 84° C. The yield was 49% of theory.

*Example XVII*

Using a procedure analogous to that described in Example I, heating a mixture of 4-pyridyl-n-octyl-thioether and chloroacetic acid-n-octyl ester for eight hours at 80° C. yielded N-carbo-n-octyloxy-methyl-[pyridinium-(4)-n-octyl-thioether]-chloride of the formula having a melting point of 169° C. The yield was 42% of theory.

*Example XVIII*

Using a procedure analogous to that described in Example I, heating a mixture of 4-pyridyl-n-dodecyl-thioether and chloroacetic acid-n-octyl ester for eight hours at 80° C. yielded N-carbo-n-octyloxy-methyl-[pyridinium-(4)-n-dodecyl-thioether]-chloride of the formula

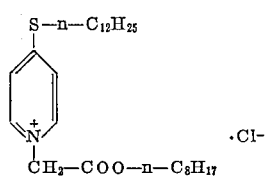

having a melting point of 164–166° C. The yield was 54% of theory.

*Example XIX*

Using a procedure analogous to that described in Example I, heating a mixture of 4-pyridyl-ethyl-thioether and chloroacetic acid-n-dodecyl ester for six hours at 80° C. yielded N-carbo-n-dodecyloxy-methyl-[pyridinium-(4)-ethyl-thioether]-chloride of the formula

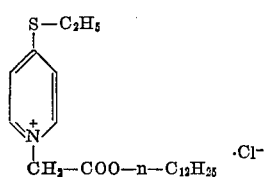

having a melting point of 169–170° C. The yield was 47% of theory.

*Example XX*

Using a procedure analogous to that described in Example I, heating a solution of 4-pyridyl-n-octyl-thioether and chloroacetic acid-phenol ester in acetonitrile for six hours at 70° C. yielded N-carbophenoxy-methyl-[pyridinium-(4)-n-octyl-thioether]-chloride of the formula

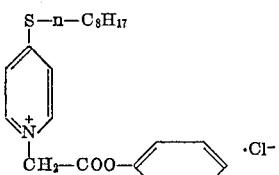

having a wax-like consistency. The yield was 39% of theory.

*Example XXI*

Using a procedure analogous to that described in Example I, heating a mixture of 4-pyridyl-n-dodecylthioether and chloroacetic acid amide for two hours at 80° C. yielded N-carbamylmethyl-[pyridinium-(4)-n-dodecyl-thioether]-chloride of the formula

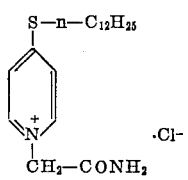

having a melting point of 217° C. (decomposition). The yield was 76% of theory.

*Example XXII*

Using a procedure analogous to that described in Example I, heating a mixture of 4-pyridyl-n-dodecyl-thioether and N,N-diethyl-chloroacetic acid amide for eight hours at 80° C. yielded N-(N',N'-diethyl-carbamyl)-methyl-[pyridinium-(4)-n-dodecyl-thioether]-chloride of the formula

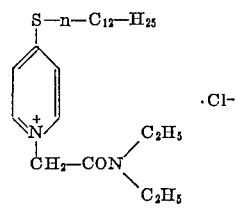

having a melting point of 82° C. The yield was 89% of theory.

*Example XXIII*

Using a procedure analogous to that described in Example I, heating a mixture of 4-pyridyl-n-dodecyl-thioether and chloropropionic acid-isopropyl ester for eight hours at 80° C. yielded N-(carbo-isopropyloxy)-ethyl-[pyridinium-(4)-n-dodecyl-thioether]-chloride of the formula

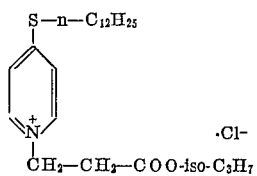

having a melting point of 114° C. The yield was 48% of theory.

*Example XXIV*

Using a procedure analogous to that described in Example I, heating a mixture of 4-pyridyl-n-tetradecyl-thioether and 2,4,5-trichlorobenzyl-chloride for one hour at 100° C. yielded N-(2,4,5-trichlorobenzyl)-[pyridinium-(4)-n-tetradecyl-thioether]-chloride of the formula

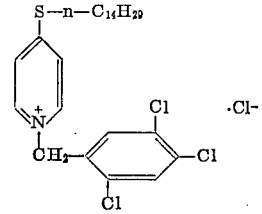

having a melting point of 100–101° C. The yield was 66% of theory.

*Example XXV*

Using a procedure analogous to that described in Example I, heating a mixture of 4-pyridyl-o-hydroxy-phenyl-thioether and 2,4,5-trichlorobenzyl-chloride for one hour at 130° C. yielded N-(2,4,5-trichlorobenzyl)-[pyridinium-(4)-o-hydroxyphenyl-thioether]-chloride of the formula

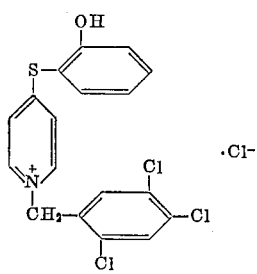

having a melting point of 185–188° C. The yield was 62% of theory.

*Example XXVI*

Using a procedure analogous to that described in Example I, heating a mixture of 4-pyridyl-p-chlorophenyl-thioether and 2,4,5-trichlorobenzyl-chloride for one hour at 100° C. yielded N-(2,4,5-trichlorobenzyl)-[pyridinium-(4)-p-chlorophenyl-thioether]-chloride of the formula

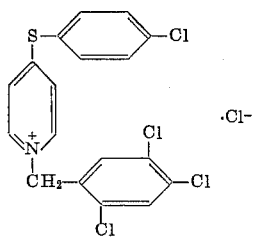

having a melting point of 183–184° C. The yield was 98% of theory.

*Example XXVII*

Using a procedure analogous to that described in Example I, heating a mixture of 4-pyridyl-methyl-thioether and n-dodecyl-bromide for six hours at 100° C. yielded N - n-dodecyl-[pyridinium-(4)-methyl-thioether]-bromide of the formula.

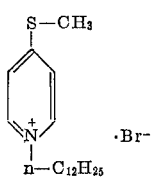

having a melting point of 105° C. The yield was 51% of theory.

*Example XXVIII*

Using a procedure analogous to that described in Example I, heating a solution of 4-pyridyl-p-chlorophenyl-thioether and n-hexadecyl-bromide in ethanol for twenty hours at 125° C. yielded N - n - hexadecyl - [pyridinium-(4)-p-chlorophenyl-thioether]-bromide of the formula

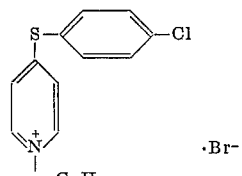

having a melting point of 104–105° C. The yield was 76% of theory.

*Example XXVIX*

Using a procedure analogous to the described in Example I, heating a mixture of 4-pyridyl-n-dodecyl-thioether and p-nitrobenzyl-chloride for one hour at 100° C. yielded N - (p - nitrobenzyl)-[pyridinium-(4)-n-dodecyl-thioether]-chloride of the formula

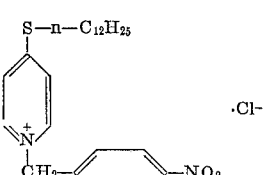

having a melting point of 120–122° C. The yield was 71% of theory.

*Example XXX*

Using a procedure analogous to that described in Example I, refluxing a solution of 4-pyridyl-n-hexadecyl-thioether and allyl bromide in acetonitrile for eight hours yielded N - allyl-[pyridinium-(4)-n-hexadecyl-thioether]-bromide of the formula

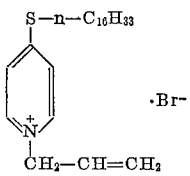

having a melting point of 72–75° C. The yield was 70% of theory.

*Example XXXI*

Using a procedure analogous to that described in Example I, heating a mixture of 4-pyridyl-n-hexadecyl-thioether and chloroacetic acid ethyl ester for eight hours at 80° C. yielded N-carbethoxymethyl-[pyridinium-(4)-n-hexadecyl-thioether]-chloride of the formula

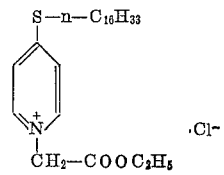

having a melting point of 150–153° C. The yield was 66% of theory.

*Example XXXII*

Using a procedure analogous to that described in Example I, heating a mixture of 4-pyridyl-p-chlorobenzyl-thioether and chloroacetic acid ethyl ester for eight hours at 80° C. yielded N-carbethoxymethyl-[pyridinium-(4)-p-chlorobenzyl-thioether]-chloride of the formula

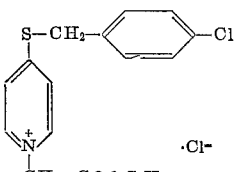

having a melting point of 166° C. The yield was 42% of theory.

*Example XXXIII*

Using a procedure analogous to that described in Example I, heating a mixture of 4-pyridyl-ethyl-thioether and chloroacetic acid-n-amyl ester for eight hours at 80° C. yielded N - carbo-n-amyloxy-methyl-[pyridinium-(4)-ethyl-thioether]-chloride of the formula

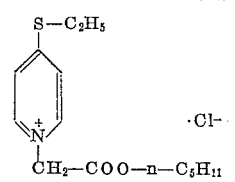

having a melting point of 180° C. The yield was 64% of theory.

*Example XXXIV*

Using a procedure analogous to that described in Example I, heating a mixture of 4-pyridyl-n-dodecyl-thioether and chloroacetic acid-n-amyl ester for eight hours at 80° C. yielded N-carbo-n-amyloxy-methyl-[pyridinium-(4)-n-dodecyl-thioether]-chloride of the formula

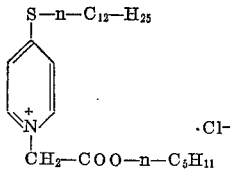

having a melting point of 184° C. The yield was 56% of theory.

Example XXXV

Using a procedure analogous to that described in Example I, heating a mixture of 4-pyridyl-n-hexadecyl-thioether and chloroacetic acid-n-amyl ester for eight hours at 80° C. yielded N-carbo-n-amyloxy-methyl-[pyridinium-(4)-n-hexadecyl-thio-ether]-chloride of the formula

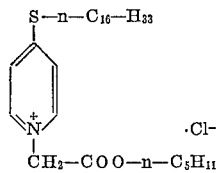

having a melting point of 175–178° C. The yield was 70% of theory.

Example XXXVI

Using a procedure analogous to that described in Example I, heating a mixture of 4-pyridyl-p-chlorobenzyl-thioether and chloroacetic acid-n-amyl ester for eight hours at 80° C. yielded N-carbo-n-amyloxy-methyl-[pyridinium-(4)-p-chlorobenzyl-thio-ether]-chloride of the formula

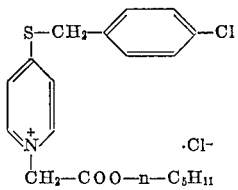

having a melting point of 193° C. The yield was 38% of theory.

Example XXXVII

Using a procedure analogous to that described in Example I, heating a mixture of 4-pyridyl-ethyl-thioether and chloroacetic acid-n-octyl ester for eight hours at 80° C. yielded N - carbo - n - octyloxy - methyl - [pyridinium-(4)-ethyl-thioether]-chloride of the formula

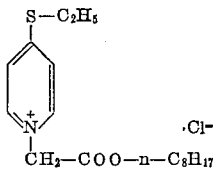

having a melting point of 168° C. The yield was 48% of theory.

Example XXXVIII

Using a procedure analogous to that described in Example I, heating a mixture of 4-pyridyl-n-hexadecyl-thioether and chloroacetic acid-n-octyl ester for eight hours at 80° C. yielded N-carbo-n-octyloxy-methyl-[pyridinium-(4)-n-hexadecyl-thioether]-chloride of the formula

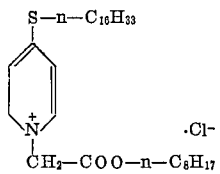

having a melting point of 146–148° C. The yield was 74% of theory.

Example XXXIX

Using a procedure analogous to that described in Example I, heating a mixture of 4-pyridyl-p-chlorobenzyl-thioether and chloroacetic acid-n-octyl ester for eight hours at 80° C. yielded N-carbo-n-octyloxy-methyl-[pyridinium-(4)-p-chlorobenzyl-thioether]-chloride of the formula

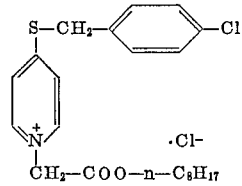

having a melting point of 197° C. The yield was 41% of theory.

Example XL

Using a procedure analogous to that described in Example I, refluxing a solution of 4-pyridyl-n-hexadecyl-thioether and benzyl chloride in acetonitrile for eight hours yielded N - benzyl - [pyridinium - (4) - n-hexadecyl-thioether]-chloride of the formula

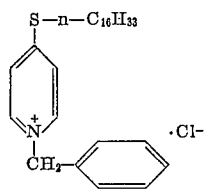

having a melting point of 113° C. The yield was 56% of theory.

Example XLI

Using a procedure analogous to that described in Example I, refluxing a solution of 4-pyridyl-n-hexadecyl-thioether and p-chlorobenzyl chloride in acetonitrile for eight hours yielded N-p-chlorobenzyl-[pyridinium-(4)-n-hexadecyl-thioether]-chloride of the formula

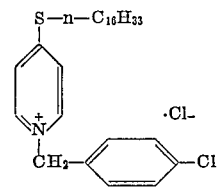

having a melting point of 176–178° C. The yield was 63% of theory.

Example XLII

Using a procedure analogous to that described in Example I, refluxing a solution of 4-pyridyl-n-hexadecyl-thioether and 2,4,5-trichlorobenzyl chloride in acetonitrile for eight hours yielded N-2,4,5-trichlorobenzyl-[pyridinium-(4)-n-hexadecyl-thioether]-chloride of the formula

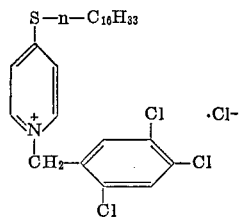

having a melting point of 116° C. The yield was 44% of theory.

Example XLIII

Using a procedure analogous to that described in Example I, refluxing a solution of 4-pyridyl-n-dodecylthioether and p-methyl-benzyl chloride in acetonitrile for eight hours yielded N-p-methylbenzyl-[pyridinium-(4)-n-dodecyl-thioether]-chloride of the formula

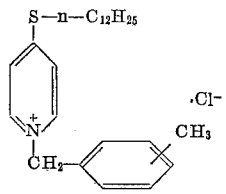

having a melting point of 30–40° C. The yield was 30% of theory.

*Example XLIV.—Preparation of N-methyl-[pyridinium-(4)-n-dodecyl-thioether]-bromide by Method C*

A solution of 5.5 gm. of 4-chloro-pyridiniumiodomethylate and 18 gm. of potassium sulfhydrate in 80 cc. of absolute ethanol was heated for six hours at 60° C. Thereafter, the reaction solution was concentrated by evaporation in vacuo and the residue was extracted with acetone. The acetone extract solution was evaporated, yielding 2.5 gm. of raw N-methyl-4-thiopyridone. After recrystallization from acetone the thiopyridone intermediate had a melting point of 150–152° C.

0.5 gm. of the thiopyridone and 1 gm. of doecyl bromide were dissolved in butanol, and the solution was heated for one hour at 90° C. The reaction solution was allowed to cool and was then admixed with ether, whereby a precipitate formed. The precipitate was separated and was recrystallized from a mixture of ethanol and ether. 1.2 gm. (80% of theory) of N-methyl-[pyridinium-(4)-n-dodecyl-thioether]-bromide of the formula

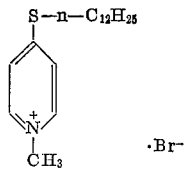

were obtained. The product had a melting point of 78–80° C.

As previously indicated, we have discovered that the quaternary pyridinium compounds embraced by Formula I above have highly effective bactericidal and fungicidal properties and are useful in combatting a broad spectrum of bacteria and fungi. They are especially effective in inhibiting the growth of fungi which are ordinarily very difficult to control, such as *Aspergillus niger* and *Candida albicans*, and undergo no decrease in acivity in the presence of proteins. Consequently, the quaternary pyridinium thioethers embraced by Formula I may be employed as active ingredients in broad spectrum bactericidal and fugicidal compositions adapted for home and industrial use.

Because of their low phyto-toxicity the compounds embraced by Formula I may also be employed as highly effective agricultural and horticultural fungicidal agents.

The discovery that compounds of the Formula I above are highly effective bactericidal and fungicidal agents is unexpected and surprising in view of the fact that quaternary 4-pyridyl-thioethers which have only lower alkyl substituents of less than 6 carbon atoms attached to the sulfur and nitrogen atoms exhibit no antimicrobial activity at all.

For use in combatting bacteria and fungi the compounds of the Formula I above are advantageously dissolved or dispersed in an inert carrier substance, such as water, kaolin or the like, to form bactericidal and fungicidal solutions, suspensions, dusting powders and the like. The range of effective concentration of the compounds in such compositions is from 0.01 to 5.0% by weight, preferably 0.02 to 1.0 % by weight, based on the total weight of the composition. Since the quaternary compounds of the present invention are readily water-soluble, they may be directly dissolved in the required amount of water to form a bactericidal and fungicidal solution. Such solution may, if desired, also comprise other disinfectant ingredients as well as customary stabilizers.

For agricultural and horticultural use the quaternary pyridyl-thioethers of the present invention are preferably compounded into a sprayable aqueous composition in concentrations of 0.02 to 5.0% by weight, said aqueous composition comprising in addition a suspension agent, such as kaolin, and an emulsifier, such as naphthalene sodium sulfonate. For instance, such a composition is prepared as follows: 50 gm. of 4-cetylthio-1-methyl-pyridinium-p-toluene-sulfonate (product of Example IV), 45 gm. of kaolin and 5 gm. of naphthalene sodium sulfonate are stirred into a small amount of water to form a homogeneous paste, which is then diluted with 10 liters of water. A bactericidal and fungicidal aqueous sprayable suspension is obtained which is especially effective in combatting the growth of *Peronospora viticola* and phytophthora.

While the present invention has been illustrated with the aid of certain specific embodiments thereof, it will be readily apparent to others skilled in the art that the invention is not limited to these specific embodiments and that various changes and modifications may be made without departing from the spirit of the invention or the scope of the appended claims.

We claim:

1. A disinfectant and fungicidal composition consisting essentially of water, a suspension agent, an emulsifier and from 0.01 to 5.0% by weight, based on the total weight of the composition, of 4-cetylthio-N-methyl-pyridinium-p-toluene-sulfonate.

2. The method of combating bacteria and fungi, which comprises contacting said bacteria and fungi with a quaternary 4-pyridyl-thioether of the formula

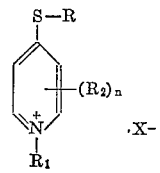

wherein:

R is selected from the group consisting of alkyl and hydroxy alkyl of 1 to 16 carbon atoms, carboxyphenyl, hydroxyphenyl, halophenyl, nitrophenyl, and halobenzyl;

$R_1$ is selected from the group consisting of alkyl of 1 to 16 carbon atoms, carbalkoxy-lower alkyl with 1 to 16 carbon atoms in the alkoxy moiety, carboxy-lower alkyl, carbophenoxy-lower alkyl, carbamyl-lower alkyl, N,N-di-lower alkyl-carbamyl-lower alkyl, halobenzyl having 1 to 3 halo substituents, nitrobenzyl having 1 to 3 nitro groups, benzyl; lower alkyl benzyl, and lower alkenyl;

at least one of substituents R and $R_1$ comprising more than 5 carbon atoms, $R_2$ is selected from the group consisting of hydrogen and lower alkyl;

$n$ is a whole number from 0 to 2, inclusive; and

X is an anion of an acid selected from the group consisting of hydrohalic acids and sulfonic acids.

3. A disinfectant and fungicidal composition for use on plants consisting essentially of water, a suspension agent, an emulsifier and from 0.01 to 5.0% by weight, based on the total weight of said composition, of a quaternary 4-pyridyl-thioether of the formula

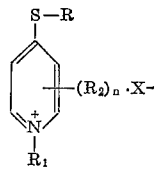

wherein R is selected from the group consisting of alkyl and hydroxy alkyl of 1 to 16 carbon atoms, carboxyphenyl, hydroxyphenyl, halophenyl, nitrophenyl, and halobenzyl; $R_1$ is selected from the group consisting of alkyl of 1 to 16 carbon atoms, carbalkoxy-lower alkyl with 1 to 16 carbon atoms in the alkoxy moiety, carboxy-lower alkyl, carbophenoxy-lower alkyl, carbamyl-lower alkyl, N,N-di-lower alkyl carbamyl-lower alkyl, halobenzyl having 1 to 3 halo substituents; nitrobenzyl having 1 to 3 nitro groups, benzyl, lower alkyl-benzyl, and lower alkenyl; at least one of substituents R and $R_1$ comprising more than 5 carbon atoms, $R_2$ is selected from the group consisting of hydrogen and lower alkyl; $n$ is a whole number from 0 to 2, inclusive; and X is an anion of an acid selected from the group consisting of hydrohalic acids and sulfonic acids.

4. The method of combatting bacteria and fungi on plants which comprises spraying the said plants with a quaternary 4-pyridyl-thioether of the formula

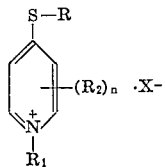

wherein R is selected from the group consisting of alkyl and hydroxy alkyl of 1 to 16 carbon atoms, carboxyphenyl, hydroxyphenyl, halophenyl, nitrophenyl, and halobenzyl; $R_1$ is selected from the group consisting of alkyl of 1 to 16 carbon atoms, carbalkoxy-lower alkyl with 1 to 16 carbon atoms in the alkoxy moiety, carboxy-lower alkyl, carbophenoxy-lower alkyl, carbamyl-lower alkyl, N,N-di-lower alkyl-carbamyl-lower alkyl, halobenzyl having 1 to 3 halo substituents, nitrobenzyl having 1 to 3 nitro groups, benzyl, lower alkyl-benzyl, and lower alkenyl; at least one of substituents R and $R_1$ comprising more than 5 carbon atoms, $R_2$ is selected from the group consisting of hydrogen and lower alkyl; $n$ is a whole number from 0 to 2, inclusive; and X is an anion of an acid selected from the group consisting of hydrohalic acids and sulfonic acids.

References Cited by the Examiner

UNITED STATES PATENTS 3,101,342   8/1963   Thomas et al. _____ 167—33

OTHER REFERENCES

Chemische Berichte, vol. 89, pages 2921–2933 (especially page 2925), 1956.

JULIAN S. LEVITT, *Primary Examiner.*